Nov. 23, 1965  C. E. HALL ETAL  3,219,254
EGG CARTON
Filed Jan. 8, 1963  11 Sheets-Sheet 7
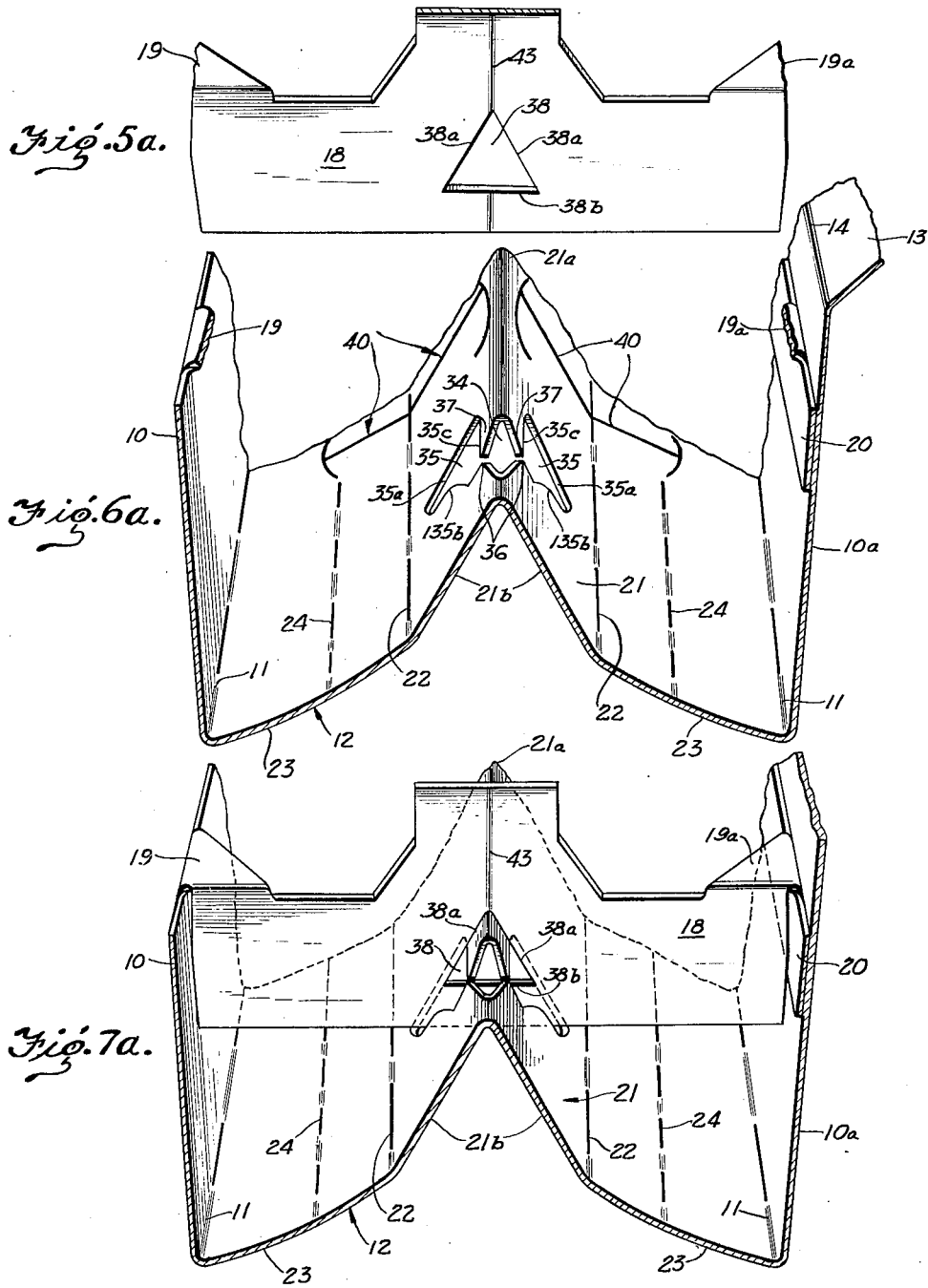
INVENTORS
Charles E. Hall and
Charles E. Hook
BY Roy A. Plant
ATTORNEY Nov. 23, 1965  C. E. HALL ETAL  3,219,254
EGG CARTON
Filed Jan. 8, 1963  11 Sheets-Sheet 8
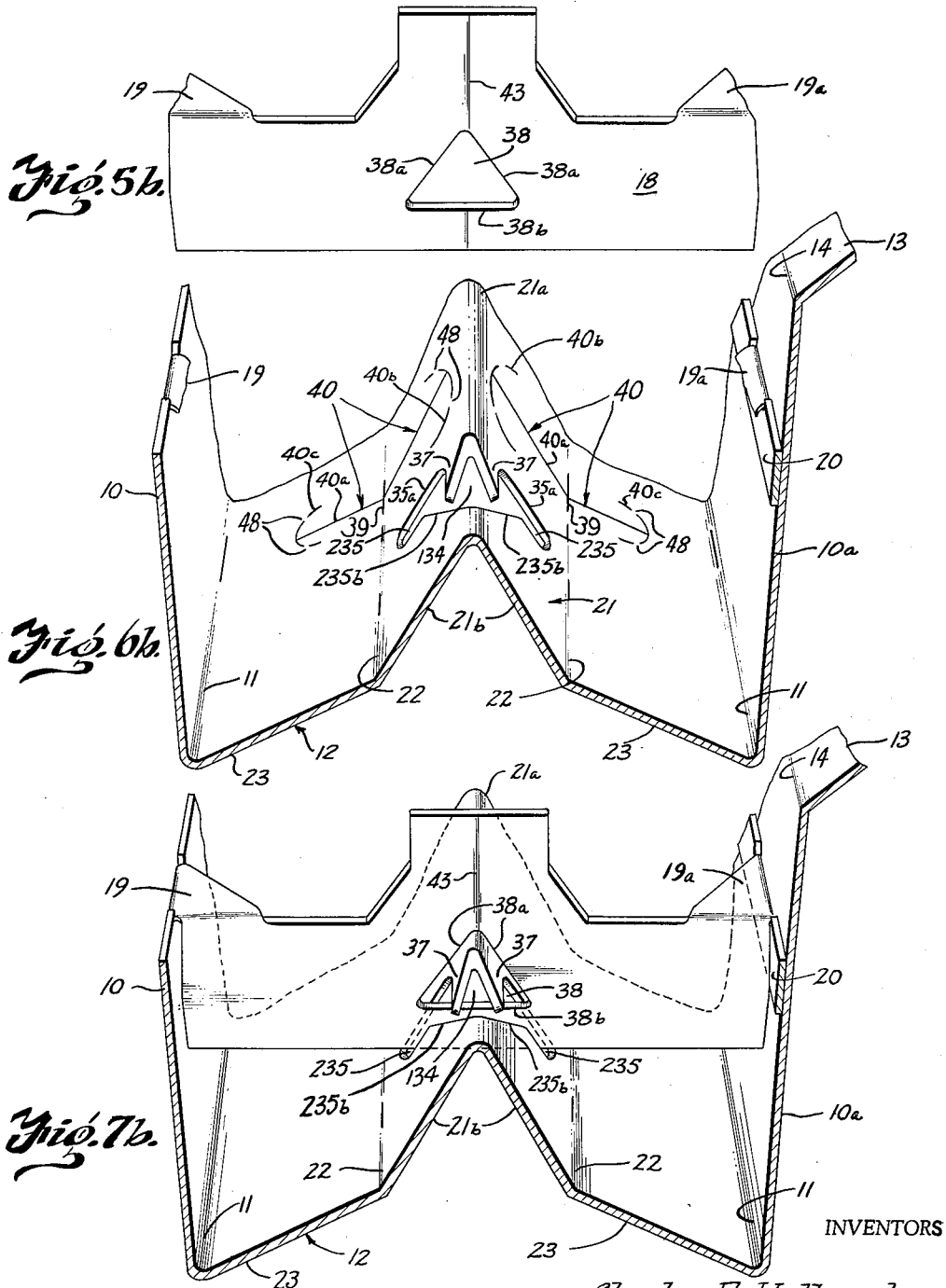
INVENTORS
Charles E. Hall and
Charles E. Hook
BY Roy A. Plant
ATTORNEY Nov. 23, 1965  C. E. HALL ETAL  3,219,254
EGG CARTON
Filed Jan. 8, 1963  11 Sheets-Sheet 9
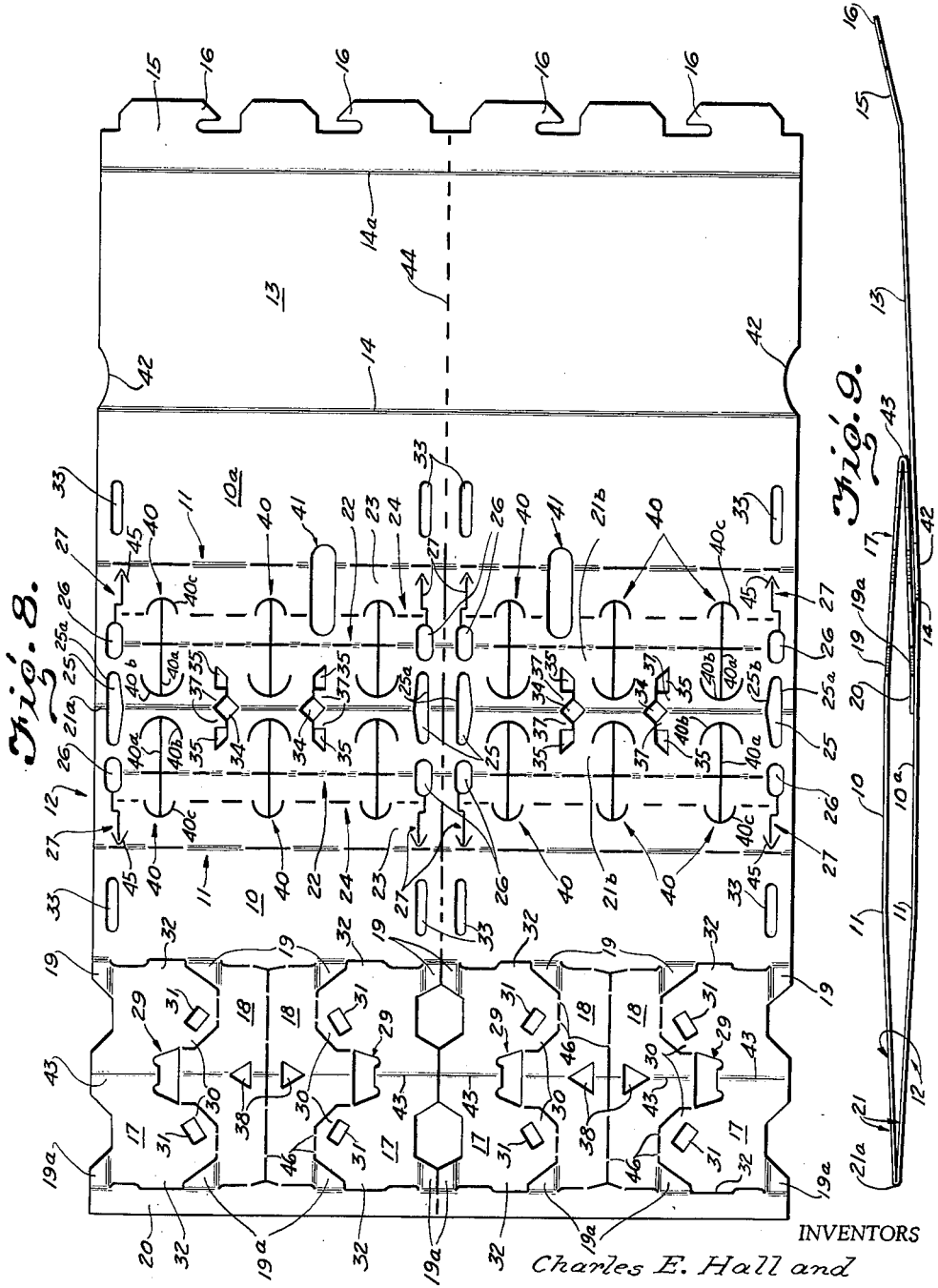
INVENTORS
Charles E. Hall and
Charles E. Hook
BY Roy A. Plant
ATTORNEY

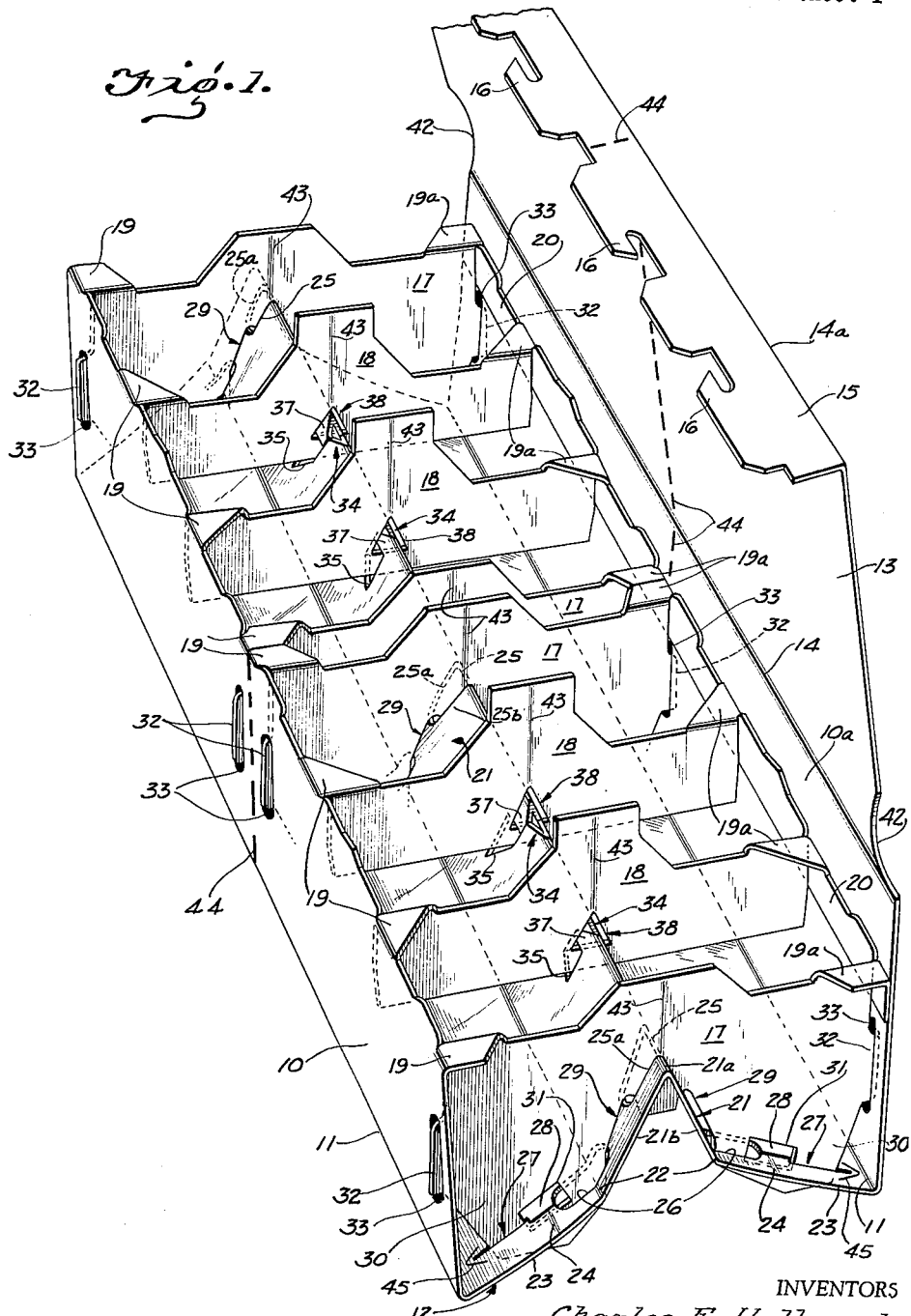

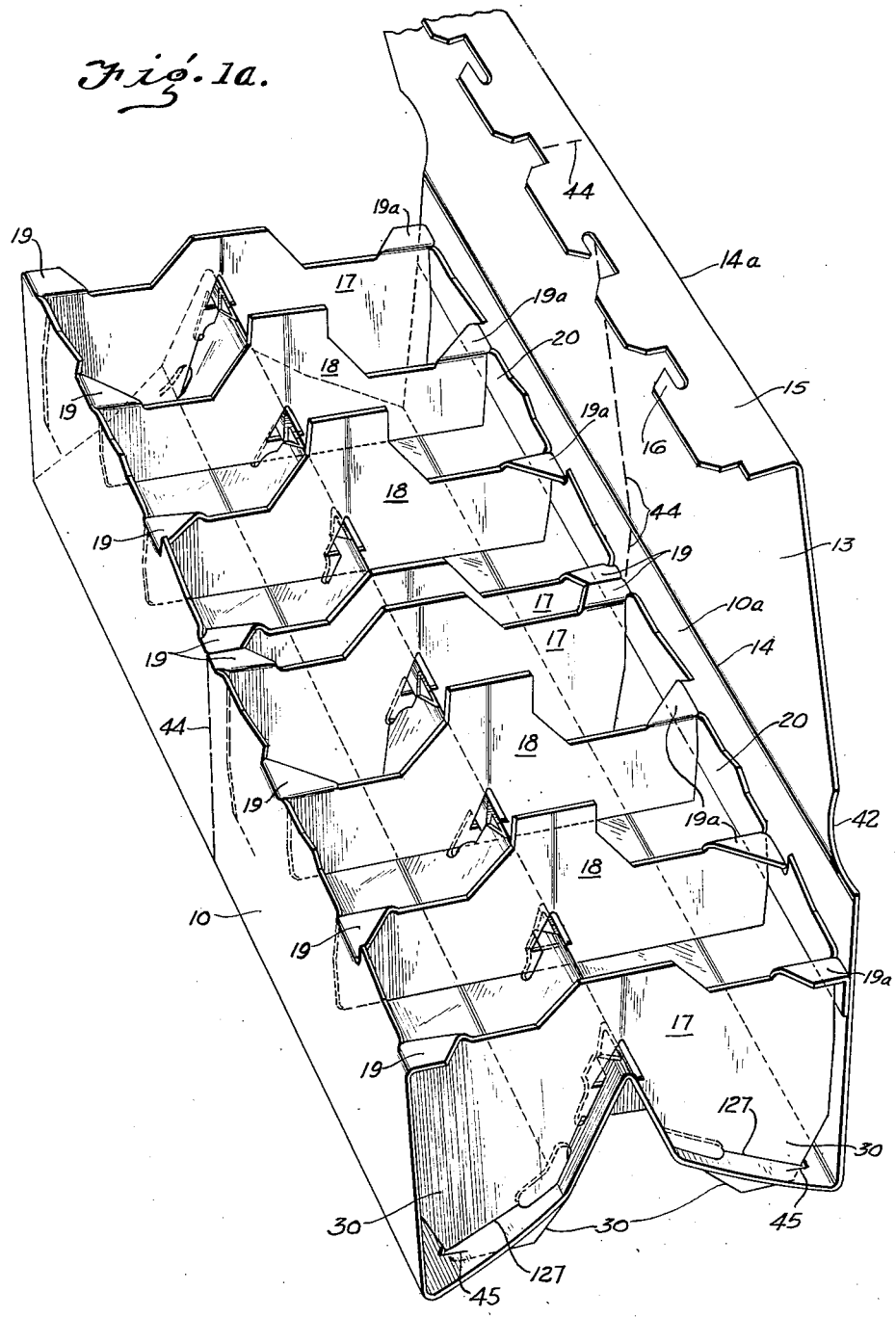

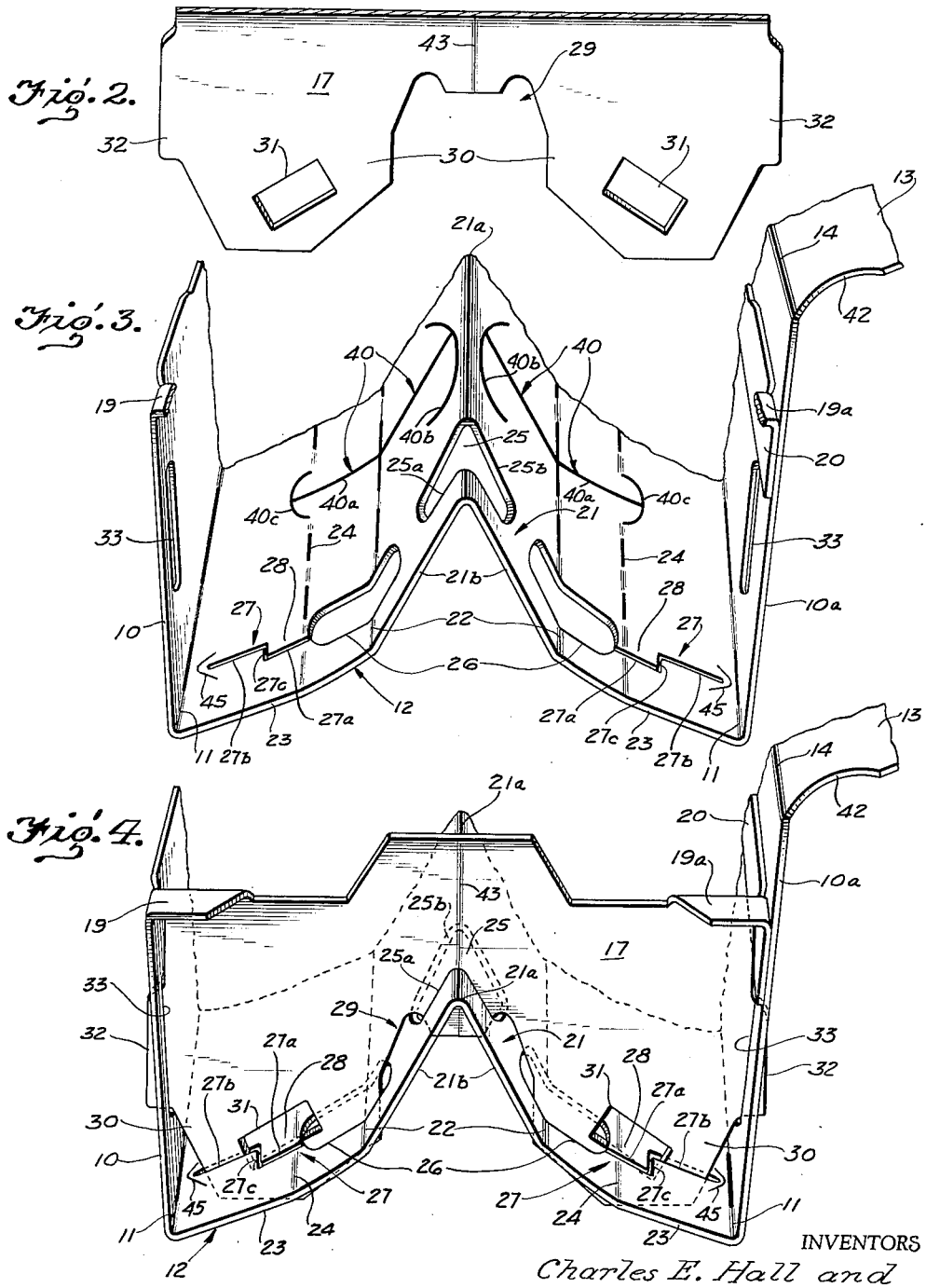

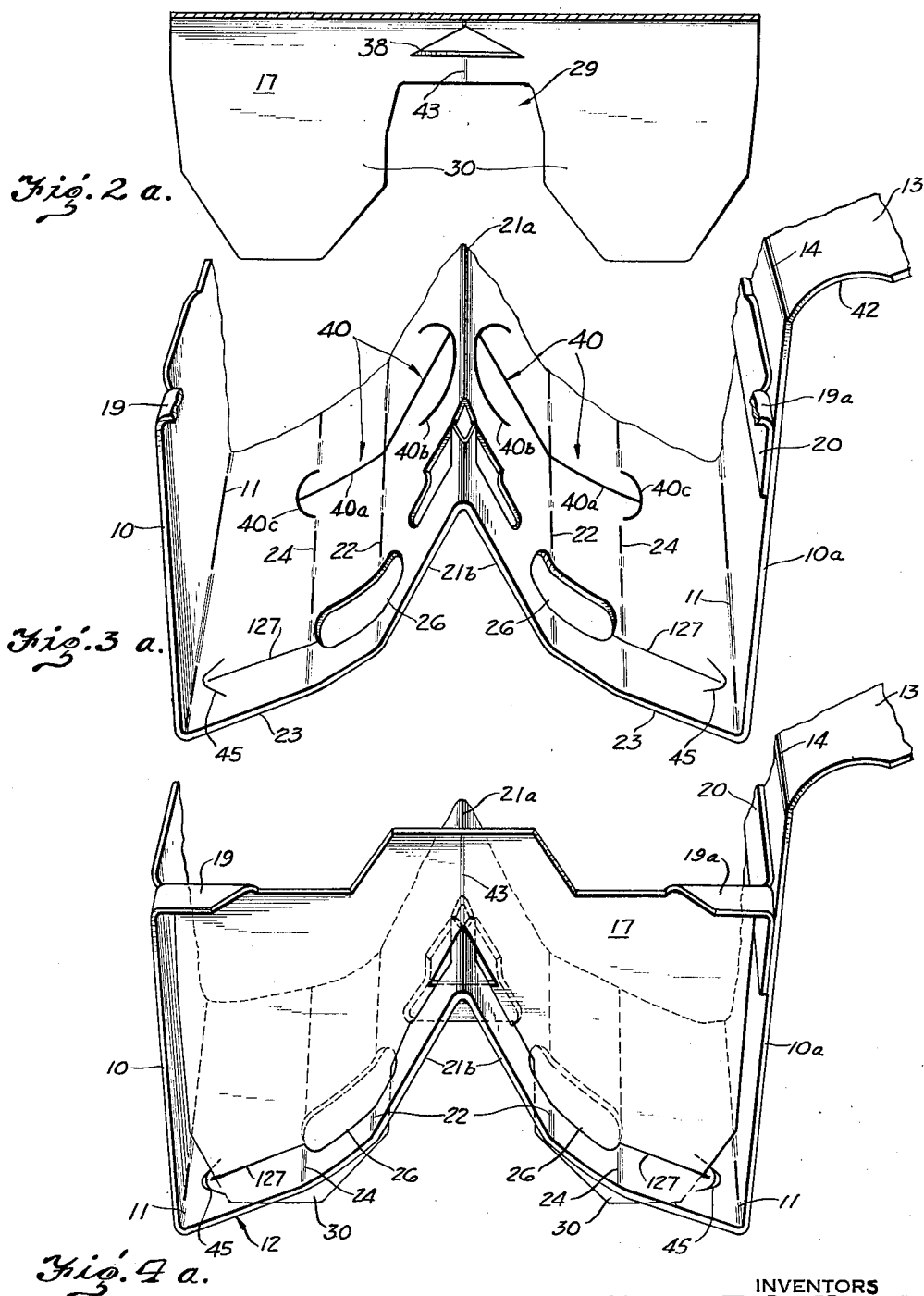

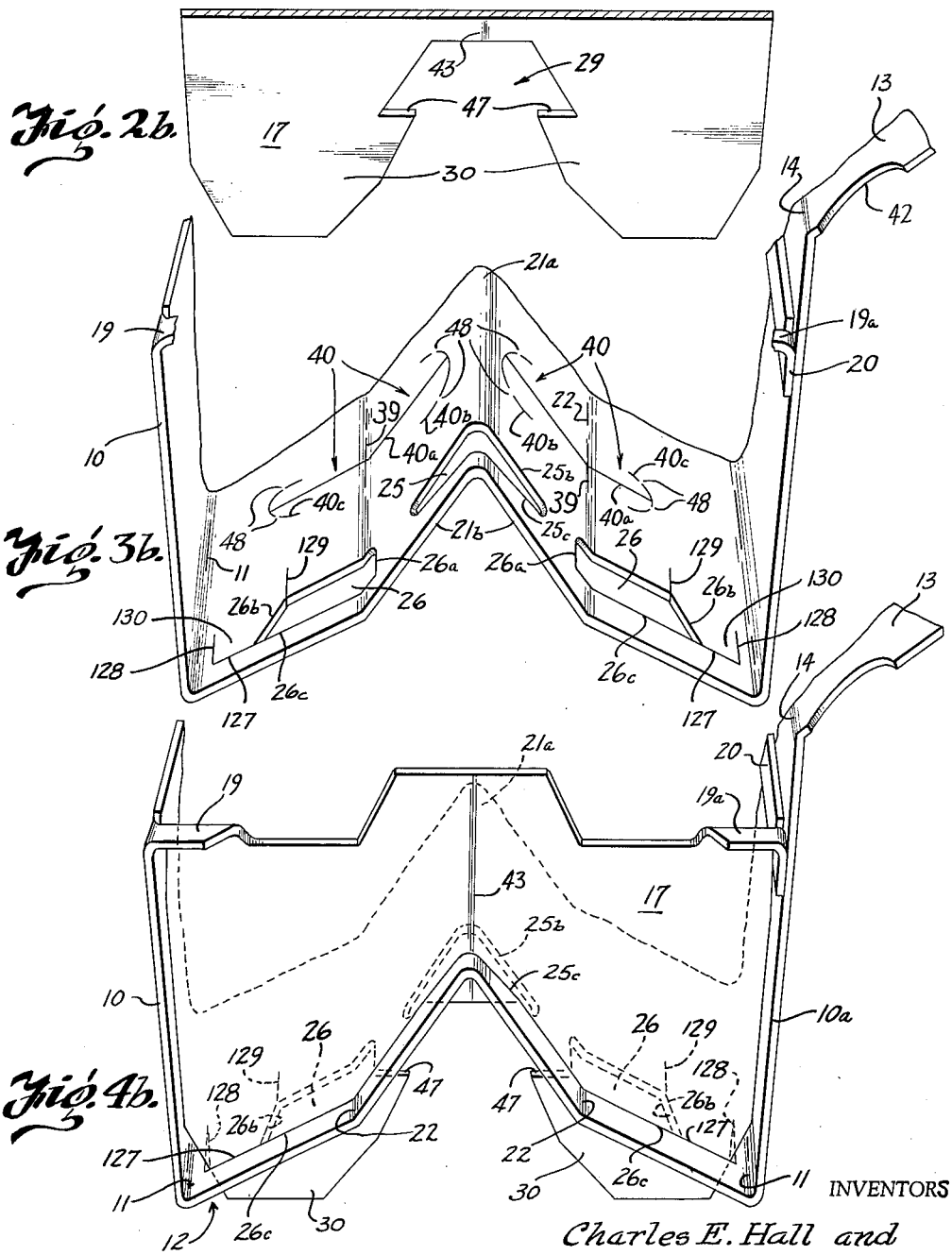

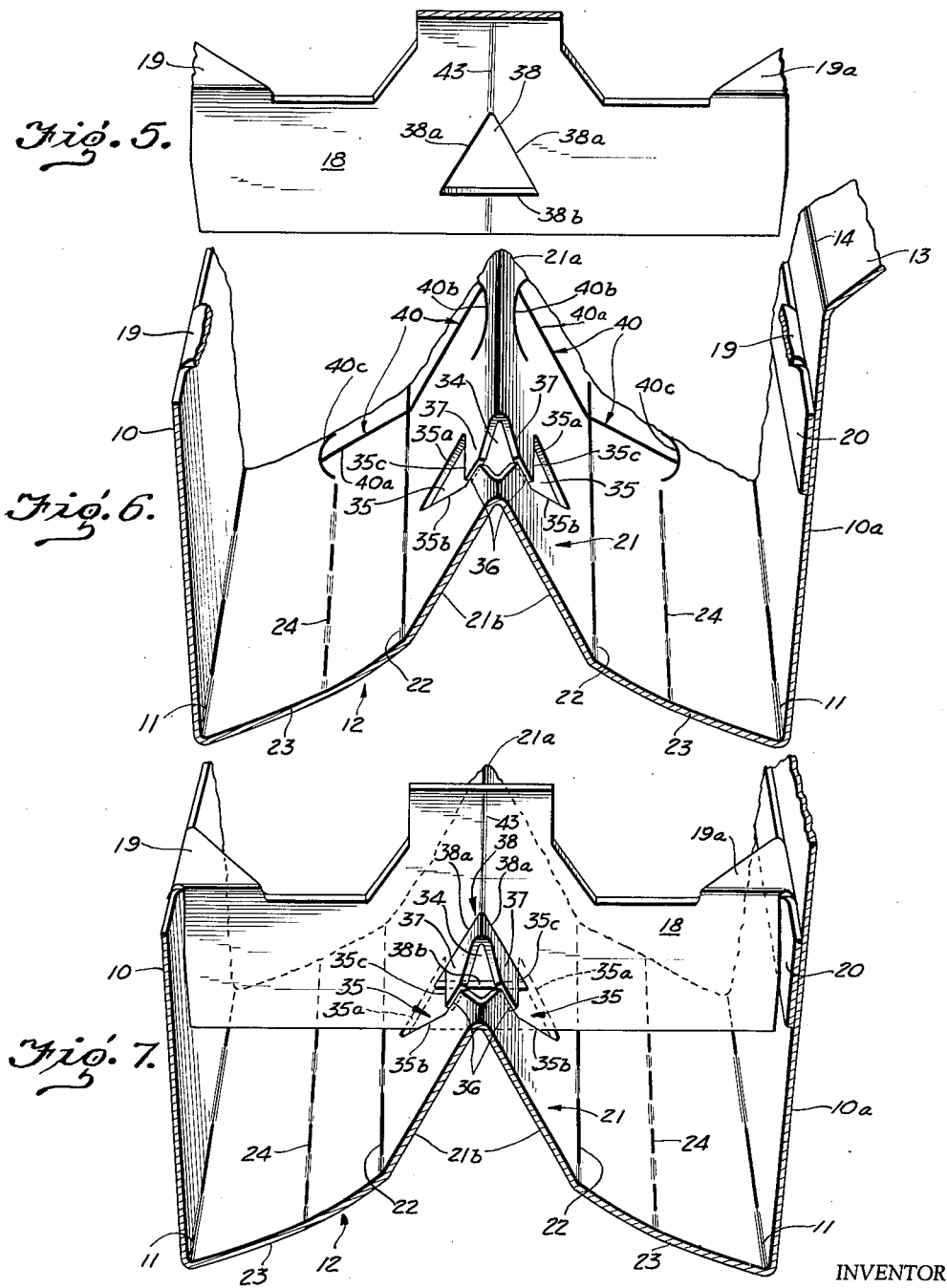

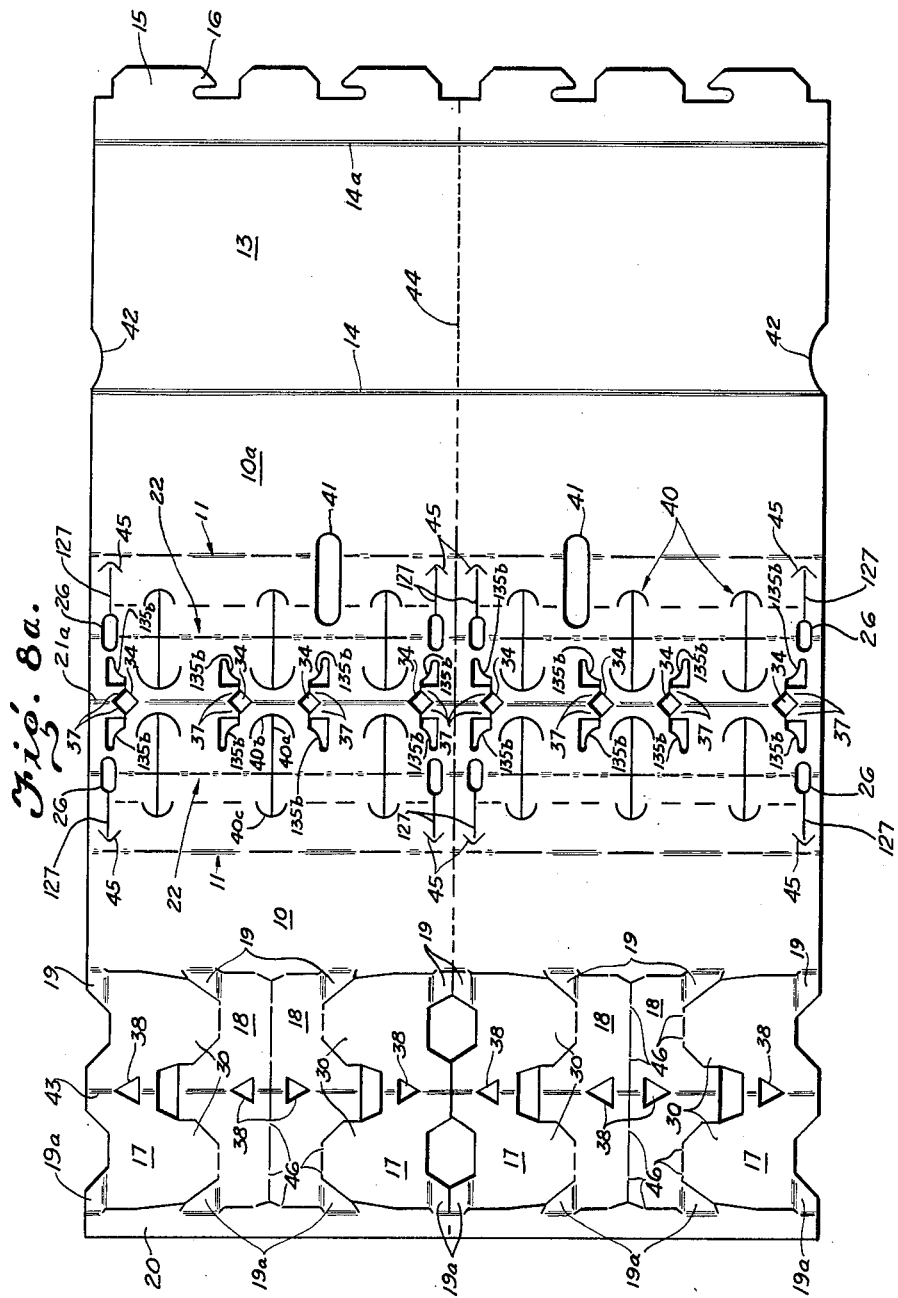

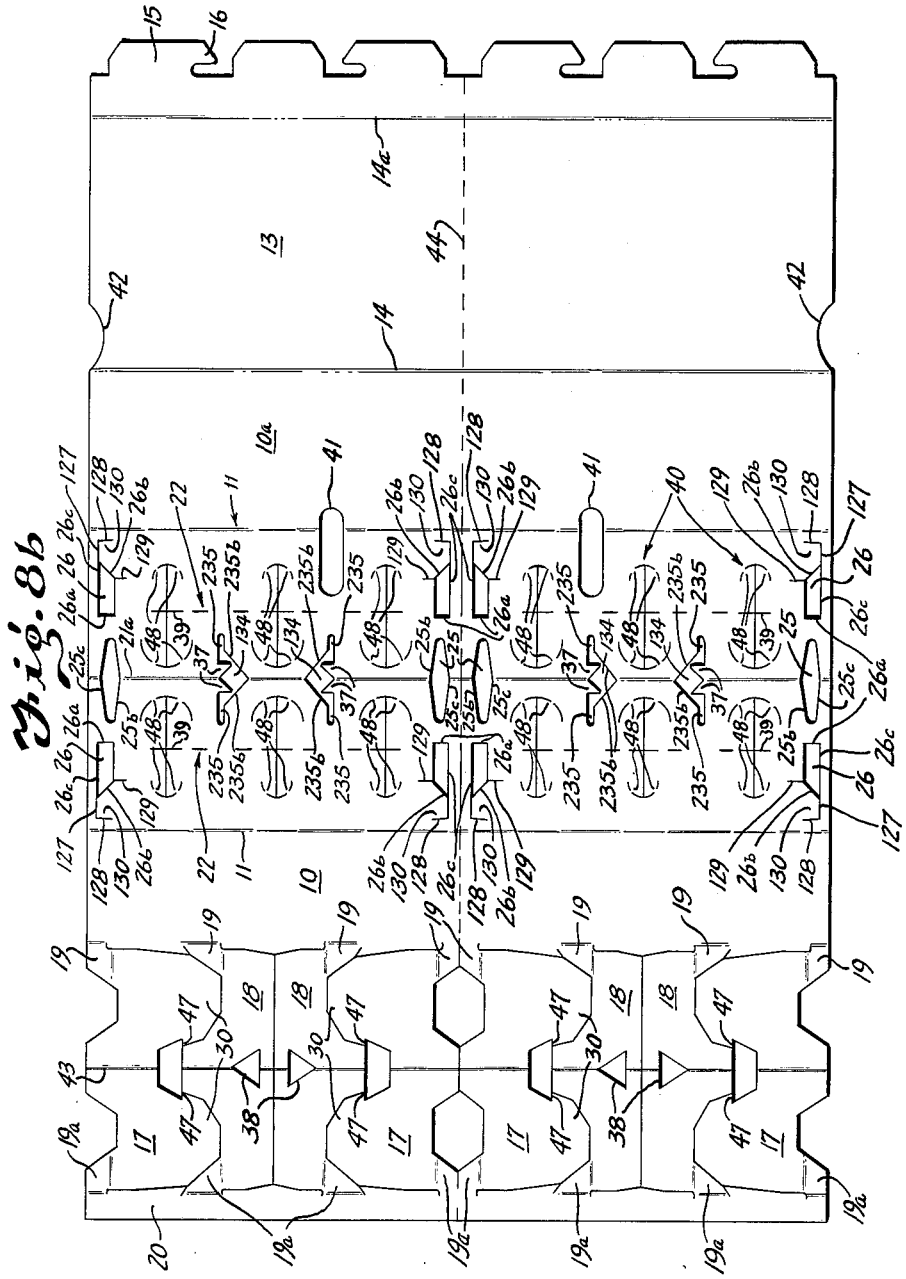

United States Patent Office 3,219,254
Patented Nov. 23, 1965

3,219,254
EGG CARTON
Charles E. Hall and Charles E. Hook, Battle Creek, Mich., assignors to Michigan Carton Co., Battle Creek, Mich., a corporation of Michigan
Filed Jan. 8, 1963, Ser. No. 251,462
9 Claims. (Cl. 229—28)

This invention relates broadly to cartons or containers, and more specifically to a cardboard egg carton of the general type in which longitudinal side walls are connected with a bottom having a central longitudinal ridge, and in which transverse end walls and partition walls are connected at their upper corners with said side walls and at their lower portions with the ridged bottom which is elevated but yet lower than said side walls. Such cartons are commonly used for shipping and marketing eggs twelve to the carton with some forms of same breakable crosswise into two halves whenever a customer only wishes to buy a half dozen eggs.

While some forms of egg cartons of the above-mentioned type have met with unquestionable success, many forms have sidewise projecting partitions in the carton blank and thus require extra stock to make each carton, while the structures for connecting the transverse walls of other cartons with the bottom of same have not been as rigid, strong, and reliable as desired, and adequate provision has been lacking for firmly holding the intermediate partitions and end walls against undesirable deformation. It was a recognition of this problem and the lack of a completely satisfactory solution to same, which led to the conception and development of the present invention.

Accordingly among the objects of the present invention is the provision of means aimed to overcome these shortcomings without complication and, in general, without increasing cost of manufacture, or sale price of the cartons.

Another object is to provide an egg carton which is exceptionally rigid when set up and thus better able to protect eggs packed therein from breakage under carrying and shipping conditions.

A further object is to provide a unique means for locking the end and intermediate partitions in upright position ready for filling the carton with eggs.

A further object is to provide an egg carton which can be produced from a substantially rectangular blank so as to be less subject to injury than the old style blanks with sidewise projecting cross partition members, and use less carton stock.

A further object is to provide an egg carton adapted to be either hand machine or high speed automatic machine set up, and wherein the transverse walls or cross partitions can be made free from hooks or only the tall transverse walls provided with same while the shallow intermediate transverse walls or partitions are formed with unbroken bottoms so as to be strong and rigid.

A further object is to provide the egg carton with a ridge which is top notched and provided with positive locking means for receiving and locking the bottom edge of the shallow intermediate partitions, and even the tall end partitions, while holding them relatively firmly in upright position.

A further object is to provide an egg carton which is exceptionally easy to set up with either a hand machine or a high speed automatic machine adapted for handling and forming egg cartons of the type herein described.

A further object is to provide a special cushioning means on the ridge portion of the egg carton for each cell to receive an egg, and wherein a different principle is involved which allows the eggs to be exceptionally well cushioned against breakage.

Still further objects and advantages of the invention will appear as the description proceeds.

To the accomplishment of the foregoing and related ends, the invention, then, consists of the egg carton means hereinafter fully described and particularly pointed out in the claims, the annexed drawings and the following description setting forth in detail certain means for carrying out the invention, such disclosed means illustrating, however, but several of various ways in which the principle of the invention may be used.

In the annexed drawings:

FIGURE 1 is a fragmentary perspective view of one form of the improved egg carton.

FIGURE 2 is an enlarged, fragmentary sectional perspective view of one of the tall transverse walls provided at each end of each six-cell half of the carton.

FIGURE 3 is a fragmentary perspective view of an end portion of the improved carton showing the side wall and bottom construction with which the tall transverse wall of FIGURE 2 is to be interlocked.

FIGURE 4 is a similar view but showing the tall transverse wall of FIGURE 2 interlocked with the side wall and bottom construction of FIGURE 3.

FIGURE 5 is an enlarged, fragmentary, perspective view showing one of the intermediate shallow transverse walls provided between the end walls of each six-cell half of the carton.

FIGURE 6 is a fragmentary perspective view of an intermediate portion of the improved carton showing the bottom construction with which the shallow transverse wall of FIGURE 5 is to be interlocked.

FIGURE 7 is a fragmentary perspective view showing the shallow transverse wall of FIGURE 5 interlocked with the bottom construction of FIGURE 6.

FIGURE 8 is a plan view of the blank from which the improved egg carton shown in FIGURES 1 to 7, inclusive is formed.

FIGURE 9 is an enlarged edge view showing the flat form, with its sides partially separated for clarity of showing, into which the blank of FIGURE 8 is folded and glued at the factory, in readiness for shipment and eventual setting-up, by hand machine or automatic machine, to form the finished egg carton of FIGURE 1.

FIGURES 1a to 8a, inclusive, show a modified and improved construction of the egg carton of the present invention, and which views correspond in general with the showing in the similar views of FIGURES 1 to 8, inclusive, so as to more clearly point out the differences between the two forms of the egg carton.

FIGURES 2b to 8b, inclusive, show a still further modified and improved construction of the egg carton of the present invention which is a little more positive in action and somewhat easier to set up with an appropriate type of automatic egg carton set up machine, said figures corresponding in general with the showing in the similar views of FIGURES 2 to 8, inclusive, so as to very clearly and specifically illustrate the differences involved in the new construction as compared with the other forms illustrated.

The carton construction will first be described by reference to FIGURES 1 to 7, inclusive, and where convenient and appropriate the same reference numbers used in describing the various structural formations in those figures will be placed on the corresponding formations of the blank in FIGURE 8, and on the pre-glued and folded-flat blank in FIGURE 9, as well as on FIGURES 1a to 8a, inclusive, and 2b to 8b, inclusive.

A relatively narrow longitudinal side wall 10 and a taller side wall 10a are connected along fold lines 11 with a bottom portion between them which is generally designated at 12. A cover 13 is connected along a hinge line 14 with the upper edge of the tall side wall 10a and has a flange 15 provided on its edge with cover-locking hooks 16. These hooks are of known form and coact in a known way with elements hereinafter mentioned. The side walls 10 and 10a, the bottom 12, the cover 13 and the flange 15 may be conventionally weakened by perforations or intermittent slits at 44, FIGURES 1 and 8, permitting breaking of the carton having a normal capacity of twelve eggs, into two end halves each having a capacity of six eggs.

Relatively tall transverse walls 17 are provided at both ends of each six-egg half of the carton on opposite sides of breaking line 44, and suitably spaced shallow transverse walls 18 are provided between the full depth or tall end walls of each said half. One upper corner of each of the transverse walls 17 and 18, is integrally connected with the upper edge of the side wall 10 by means of a web 19. The other upper corners of the transverse walls 17 and 18, are integrally connected to webs 19a. All of the webs 19a are integral with a longitudinal strip 20 which, in the completed egg carton, is glued to the inner face of side wall 10a, as shown in FIGURE 1. These connections of the upper side edges of the transverse and longitudinal walls of the egg carton are conventional, and it is with the webs 19 that the cover-locking hooks 16 conventionally coact.

The general shape of the bottom 12 in the transverse section, of the set-up egg carton is conventional. A central longitudinal ridge 21, FIGURES 1, 3, 4, 6 and 7, of inverted V-shape in transverse section, is joined along fold lines 22 to two longitudinal bottom panels 23 and these panels are joined along the fold lines 11 to the side walls 10 and 10a. The bottom panels 23 are preferably weakened somewhat along lines 24 in order that they may readily yield into the desired shape when the egg carton is being set up ready to receive eggs.

The present invention resides partially in the novel constructions for securing the transverse walls 17 and 18 tenaciously in place when set up as shown in FIGURES 1 and 1a, and the structure associated with the full depth end walls 17 will first be described, by reference to FIGURE 1 and more particularly to the fragmentary and relatively enlarged showing in FIGURES 2 to 4, inclusive.

The crest 21a, FIGURES 3 and 4, of the ridge 21 has a plurality of notches 25 allotted one to each transverse wall 17, with each of said notches 25 extending a short distance down into the ridge side members 21b. Slots 26, which are substantially alined with notch 25, extend at their upper ends into ridge side members 21b and at their outer or lower ends into the bottom panels 23. Extending from the outer or lower end of each slot 26 toward the adjacent side wall 10 or 10a, there is a slit 27 formed in the panel 23. Each slit 27 has, extending from slot 26, a straight inner end portion 27a, FIGURE 3, a straight outer end portion 27b offset longitudinally inward from the ends of each half of the carton from said inner end portion 27a, and a short intermediate portion 27c connects the adjacent ends of said inner and outer end portions 27a and 27b of slit 27. The inner end portion 27a is preferably a little closer to one side edge of the associated slot 26 than to the other edge of same, as shown. The two slots 26 and the slits 27 associated therewith, provide the bottom panels 23 with substantially square ended and rather stiff locking tongues 28. In order to provide flexibility and give when lugs 30 are forced down through slits 27 in assembling the carton, there is provided, just beyond the outer end of each slit 27, and symmetrical with same, a V-shaped slit 45, the base of which is closely adjacent fold line 11. This construction proved to be far more satisfactory than expected and not only facilitated forcing the lugs 30 through slits 27 but provided locking action against reverse movement of lugs 30 in said slits. Each of the transverse end walls 17, FIGURES 2 and 8, has a central notch 29 in its lower edge to interengage with the subjacent ridge notch 25, as shown in FIGURE 4. At opposite sides of the notch 29, the wall 17 has downwardly projecting, rather extensive, lugs 30 each provided with a slot 31. During setting up of the carton, the lugs 30 are forced through the slots 26 and associated slits 27 and the tongues 28 then extend through the slots 31 of said lugs, thus firmly and tenaciously interlocking the wall 17 and the ridged carton bottom, with the slit 27 and cooperating V-shaped slit 45 aiding and abetting the holding action.

When the wall 17 is in place, FIGURES 1 and 4, it abuts the vertical wall 25a of the ridge notch 25 and is thus effectively braced against deformation longitudinally of the ridge 21 outward of the adjacent egg receiving compartment. The slits 27 and lugs 30 similarly brace and support the bottom of wall 17 against undesired distortion longitudinally of the panels 23, and this is further aided by V-shaped slit 45 through the gripping action of slit 27 facilitated by same. Provision may also be made, if desired, to prevent distortion of the ends of the wall 17 longitudinally of the side walls 10 and 10a. This latter provision consists of ears 32 on the ends of the walls 17, and vertical slots 33 in the side walls 10 and 10a, through which said ears project. The support given to walls 17 by vertical edge 25a of notch 25 and slit 27 with lugs 30 provides exceptional stability of said walls 17, and it is only when a still further support is desired for walls 17 that ears 32 and cooperating slots are utilized.

The crest 21a of the ridge 21 has a plurality of upwardly flared notches 34, FIGURES 1, 6 and 7, which extend downwardly into the ridge side members 21b. These notches are allotted, in the construction shown in FIGURE 1, to one to each of the shallow transverse walls 18. Below each notch 34, each ridge side member 21b has an opening 35 provided with a vertical edge 35a, an inclined edge 35b, and a horizontal upper edge 35c. A slit 36 extends from the upper end of the opening 35, adjacent the upper edge of 35b, to the bottom of the notch 34. The portions of the ridge side members 21b between the notch 34 and the openings 35 thus constitute short partition retaining hook tongues 37 extending longitudinally of the carton. By having edge 35b formed as shown, it facilitates locking transverse wall 18 in place, as will be hereinafter described, and yet holds transverse wall 18 more nearly perpendicular and limits the sidewise movement of the bottom of said wall 18 to a very small amount when in assembled position as shown in FIGURE 7.

The transverse wall 18, FIGURE 5, has a central opening 38 spaced upwardly from its lower edge and leaving this edge unbroken for strength which has not existed in prior structures, utilizing shallow transverse walls between deep transverse walls. The opening 38 has two upwardly converging edges 38a and a horizontal bottom edge 38b.

During setting up of a carton, the lower edge portion of the transverse wall 18 is forced into the notch 34 and then down through the slits 36 into the openings 35. The hook tongues 37 then project through opening 38 of each partition 18 as seen in FIGURE 7. The horizontal lower edges 35c of the hook tongues 37 then abut the lower edge 38b of the opening 38 and assist in preventing any sagging of the ridge 21 or relative upward movement of the transverse walls 18 with respect to said ridge. Also, the inclined edges 38a of the openings 38 are in abutting relation with the side members 21b of the ridge 21 to aid in laterally stabilizing the carton. By having edge 35b of opening 35 extend as shown holds edge 38b of wall 18 near the base of tongues 37 where the latter are strong and best able to resist upward movement of wall 18.

The ridge members 21b and the bottom panels 23 are suitably slitted at 40, FIGURES 3 and 6, or in any other adequate way, for more flexibility and egg cushioning in their egg-supporting zones. Referring to FIGURE 8 it will be noted that the slits 40 are of very special shape in that same comprises a cross slitted portion 40a, a downturned end, substantially arcuate, upper portion 40b connected to the upper end of the cross slitted portion 40a, and an upturned end, substantially arcuate, lower portion 40c connected to the lower end of said cross slitted portion 40a. The cross-slit 39 (FIGURES 3b, 6b and 8b) at the junction of the ridge panel 21b and the bottom panel 23, is preferably symmetrical with said longitudinal slit 40a, the ends of said cross-slit preferably being approximately intermediate the corresponding ends of said downturned and upturned slits 40b and 40c. This form of slitting is unexpectedly superior to other currently in use slitting patterns since it provides relatively short hinged trap door members which immediately bulge and cushion the eggs placed in the carton to protect them from breakage without having to have the eggs forced into the slitted portion of the carton with the cover of same, or waiting a day or more for the carton to gradually relax and allow the eggs to settle into and be adequately cushioned by the slitted portion of the inverted V-shaped panel assembly. This immediately available egg cushioning feature is an important feature of our invention, and is one which aids in reducing breakage of eggs packed in our improved carton, as contrasted with egg breakage in other types of egg cartons.

The slots 41 and side edge notches 42 in the blank of FIGURE 8 are simply for coaction with known elements of a carton set-up machine and form no part of the invention so far as an egg carton itself is concerned. Also, there is nothing new in the score lines 43 on the various transverse partition walls 17 and 18. They merely facilitate folding and gluing of the blank into flat form, as seen in FIGURE 9, ready for being acted upon by a set-up machine to produce the finished carton as seen in FIGURE 1.

Almost all cardboard type egg cartons have printed matter on the surface of same and in order to produce cartons of printed type at the carton producing factory, this may be handled by first printing the carton stock and then cutting, creasing, flat folding and gluing the blank formed from same ready for being set up into finished carton form, as shown in FIGURE 1, at the egg packing plant. However, in accordance with our invention, we prefer to have the flat blanks produced from unprinted stock, cut and creased ready for printing and later flat folding and gluing. Such blanks, before printing, flat folding and gluing, if desired, may be shipped flat to distributing points where printing and gluing equipment is available for quick handling of small orders for these egg cartons. If such blanks are initially fully cut and creased they may cause trouble in handling while being printed and glued due to the transverse wall members failing to lie perfectly flat while being thus handled. We have found that one way of avoiding this difficulty is to provide the transverse walls 17 and 18 with nicks 46, FIGURE 8, to hold the cut portions together in a relatively flat plane, which thus obviates substantially all of the previous difficulties incurred due to the pre-cut blank not remaining flat for printing, flat folding, gluing, and setting up, and is thus one of the many features of our invention.

In FIGURES 6, 7 and 8 the openings 35 are shown as having a vertical edge 35a at one side and a slit 36 substantially parallel thereto at the inlet to opening 35, and an inclined edge 35b extending from the bottom of slit 36 to the bottom of vertical edge 35a. With this construction the portion of the shallow transverse wall below opening 38 fits moderately loosely within opening 35 and tends to swing over to inclined edge 35b of same and thus comes moderately close to the bottom of slit 36. Under these conditions, with a blank cut as shown in FIGURE 8, it is advisable, as shown in FIGURES 6 and 7, to make the hook tongues 37 moderately deep and slit 36 moderately long to provide added strength for said tongues to resist disengagement of the shallow transverse wall 18 from said opening 35 under conditions of use.

A preferred alternate construction to that described in the previous paragraph is illustrated in FIGURES 6a, 7a and 8a. Here the tapered wall 35b of the previous construction has been modified and is shown as wall 135b which curves inward from the lower end of the wall which forms a short continuation of the side of slit 36, and has a narrow groove like portion at its lower end where it joins the bottom of vertical edge 35a. This form of the wall 135b engages the lower edge of shallow transverse wall 18 and holds the latter more nearly vertical with little lost motion and holds bottom portion 38b of opening 38 closely adjacent the base or most rigid portion of hook tongues 37. This in turn not only holds the shallow transverse walls 18 more firmly upright but permits making said hook tongues 37 a little shallower and slits 36 a little shorter all of which facilitates hooking the shallow transverse walls into openings 35.

The tall transverse or end walls 17 are preferably provided in alternate construction with an opening 38 in corresponding position to the one shown in the shallow transverse walls 18 and the ridge crest 21a is likewise provided with notches 34, slits 36, and openings 35 so that the upper portion of these tall transverse walls is held in similar manner to the shallow transverse walls 18. This construction in preferred form is illustrated more particularly in FIGURES 1a, 2a, 3a, 4a and 8a.

Anchoring of the lower or lug portions 30 of the tall transverse walls 17 is shown in fragmentary enlarged scale in FIGURES 2, 3 and 4 where wall 17 is shown as having a pair of slots 31 adapted to engage and be locked in a slit 27 which has an inner end 27a, an offset but parallel outer end 27b and an intermediate short slit 27c substantially perpendicular to said slits 27a and 27b and joining same so as to provide a locking tongue 28 which extends through slot 31 when tall transverse wall 17 is in set-up position. Slit 27 thus holds the tall transverse wall 17 firmly in upright position while locking tongue 28 resists withdrawal of the tall transverse wall 17 from said slits 27.

A modified form of the construction described in the preceding paragraph for holding the bottom of the tall transverse walls 17 is illustrated in enlarged detail in FIGURES 2a, 3a, and 4a. Here it will be noted the tall transverse walls do not have the slots 31 which are shown in FIGURE 2, and the slit 27 has been made into a single substantially straight line 127 as shown in FIGURES 3a and 4a. With the tall transverse walls 17 anchored at their upper portion through engagement of opening 38 with hook tongues 37 of ridge 21, FIGURE 3a, this holds the tall transverse wall 17 against raising and the slit 127 grips the bottom or lug portion 30 of the tall transverse wall, which is made of strong and stiff egg carton stock, so as to hold it firmly upright while further resisting withdrawal of same from said slit 127. This simplified construction has likewise been proven to be feasible and has been commercially used on a great many cartons.

A second alternate construction which has been found to be a little more easy to machine set up ready for the receipt of eggs, and at the same time avoids difficulties in connection with the "nicks" 46 where the customer tries to set up these egg cartons on machines not designed to handle cartons with "nicks," is shown in FIGURES 2b, 3b, 4b, 5b, 6b, 7b, and 8b.

In this second alternate construction, as more particularly shown in FIGURE 2b, the tall transverse walls 17 omit the slots 31 shown in FIGURE 2, and the opening 38 shown in FIGURE 2a, and the lug portion 30 of same is provided with inturned hooks 47, which when the egg carton is set up, engage the upper end of slots 26. These slots 26, for ease of engagement with hooks 47, are preferably provided with a substantially straight upper edge 26a extending lengthwise of the egg carton when set up. The lower edge 26b of slot 26 preferably tapers to a point at the outer edge 26c of slot 26. Slit 127 connects to slot 26 at this point end of same and extends substantially in line with outer edge 26c almost to fold line 11 where it is provided with a substantially straight extension 128 about a quarter inch long and substantially parallel to fold line 11. A slit 129, substantially parallel to extension 128, extends from the side of slot 26 approximately a quarter inch, and adjacent the tapered end 26b of the latter in manner providing a relatively strong locking tongue 130. The ridge 21a is provided with an opening 25 similar to that shown in FIGURE 3 except that the vertical edge 25a of the latter is shown as 25c which preferably flares outwardly substantially symmetrical to inclined edge 25b. This enlarged top edge slit 25 gives a little extra clearance for the tall transverse wall 17 to enter same during the relative upward movement of ridge 21a as it receives the transverse wall 17 which is moving to latched set up position. The special shape of slots 26 also guides the tall transverse walls 17 into final set up position.

As an aid to setting up these egg cartons by means of some of the egg carton set up machines not adapted to handle egg cartons having unbroken "nicks" holding the bottoms of the tall and shallow transverse walls in position prior to setting up the egg carton, we have found that "nicks" can be eliminated, especially where the transverse walls are "cell punched" so as to all slope backward as the carton blank passes through the flat folding and gluing steps which prepare the egg carton blank ready to be machine set up in form to be packed with eggs. Accordingly the bottoms of the tall end transverse walls of the egg carton blank as seen in FIGURE 8b are not provided with "nicks" 46 as shown in FIGURES 8 and 8a.

The ridge members 21b and bottom panels 23 are suitably slitted at 40, as has been described above, to form what may be called a "cathedral," with same having a cross slit 39 lengthwise of fold line 22. This cross slit 39 is preferably of a length such that its ends are approximately on a line drawn from the corresponding ends of curved end slits 40b and 40c and which becomes a hinge line for the cathedral. This type of construction with the hinges much shorter than the hinged members of the cathedral has been found to provide exceptional egg cushioning in the egg supporting zone of the ridge side members 21b and bottom panels 23. In fact this special form of slitting has, to the best of our knowledge, been the most satisfactory form of egg cushioning slitting ever devised for use in egg cartons. However, occasionally the curved ends of these slit portions accidentally get distorted out of place in handling and tend to catch on an adjacent flat folded egg carton when being moved through the egg carton set up machine so as to cause set up difficulties. We have found, however, that by providing the curved ends 40b and 40c with a pair of "nicks" 48, FIGURES 3b, 6b, and 8b, this trouble can be substantially completely overcome, since these "nicks" hold the slit portions temporarily in place, and yet break so easily that egg cushioning is not interfered with.

The upper end 40b of the cathedral is preferably arcuate and deeply downturned with a width in the range of approximately two-fifths to three-fifths the length of the cell, and with approximately half the length of the cell being the preferred width. On the other hand the lower end 40c of the cathedral is preferably arcuate and deeply upturned with a width in the range of approximately one-quarter to one-half the length of the cell, and with approximately one-third the length of the cell being the preferred width. These upper and lower ends 40b and 40c of the cathedral are preferably symmetrical with the ends of the longitudinal slit 40a with which they are connected. The cross slit 39 at the junction of the ridge panel 21b and the bottom panel 23 is preferably symmetrical with said longitudinal slit 40a, with the ends of said cross slit preferably being approximately intermediate the corresponding ends of said downturned and upturned slits 40b and 40c. This combination of slits provides four hinged members for each cathedral and with a hinge length much shorter than the corresponding hinge member length, a thing which it has been found provides exceptionally good cushioning of an egg resting on same, and shipping tests indicate that same helps reduce egg breakage.

While weakening lines 24 in bottom panels 23 have been shown in FIGURES 1 to 9, inclusive, and in FIGURES 1a to 8a, inclusive, same have not been shown in FIGURES 2b to 8b, inclusive, since we have found that they can be omitted without seriously affecting the setting up of the egg carton or the effectiveness of same under conditions of use, while at the same time simplifying the production of the carton blank.

In the second alternate construction, as shown in FIGURES 6b, 7b, and 8b, it will be noted that the notch 134 on the ridge 21a is a little larger than notch 34 of the other two forms of the egg carton. Also opening 235 is of modified shape as compared with openings 35 and 135 of the other two forms which have been illustrated and described. This is due to edge 235b being angular and extending from just below the bottom of notch 134 to the bottom of opening 235 close to and substantially parallel to side 35a, and with this parallel portion supporting the side of the bottom portion of transverse partition 18. With this type of construction the slit 36 at the point end of hook tongues 37 is wider, thus making it easier to pass the bottom edge of shallow transverse wall 18 therethrough while the shape of edge 235b of opening 235 holds the shallow transverse wall 18 in upright position adjacent the base of hook tongues 37 when the egg carton has been set up.

From the foregoing it will be seen that novel and advantageous improvements have been disclosed and that they may be readily embodied, without waste of stock, in a one-piece blank from which to form the present improved egg carton. Directional terms such as "vertical," "horizontal," et cetera, have been used to simplify description of the invention in the position illustrated in the drawings. Such directional terms, however, are not to be considered as limiting on the present invention since the finished egg carton can be held in various positions without changing the construction of same or the position of the parts relative to each other.

Other modes of applying the principle of our invention may be employed instead of those explained, change being made as regards the egg carton and blank therefor as herein disclosed, provided the means stated by any of the following claims or the equivalent of such stated means be employed.

We therefore particularly point out and distinctly claim as our invention:

1. In a paperboard egg carton having two parallel rows of egg receiving cells with each having a cathedral in the bottom of same, said carton having two opposed longitudinal side walls, a pair of bottom panel members with one connected to the lower edge of one of said side walls and the other connected to the lower edge of the other of said side walls, a one-piece central longitudinal ridge member of inverted V-shape in transverse section, the second edge of each of said bottom members being connected to the adjacent bottom edge of said one-piece central longitudinal ridge member, a pair of upright, tall transverse walls at opposite ends of said carton extending through the bottom thereof, upright transverse walls between said pair of tall transverse walls, and means joining the upper portion of all of said transverse walls to the upper portion of each of said side walls, (a) said cathedral being located in said ridge panel and bottom panel and substantially centered lengthwise of each of said cells, (b) said cathedral falling short of reaching the top of said ridge panel and being a little over halfway down said bottom panel, (c) said cathedral having a longitudinal slit from its top to its bottom and a cross-slit substantially symmetrical thereto at the junction of said ridge panel and bottom panel portion, (d) the upper end of said longitudinal slit joining a deeply downturned end cross-slit extending sidewise in the range of approximately two-fifths to three-fifths the length of said cell while the lower end of said longitudinal slit joins a deeply upturned end cross-slit extending sidewise in the range of approximately one-fourth to one-half the length of said cell, (e) said downturned and upturned slits being substantially symmetrical with the ends of said longitudinal slit, (f) said cross-slit at the junction of said ridge panel and bottom panel portions being of a length substantially intermediate of the sidewise extension length of said downturned and upturned cross-slits, and (g) said downturned slit being larger in sidewise dimension and deeper than said upturned slit, whereby the upturned and downturned ends conform closely and easily to the contour of the eggs while providing hinge action about a short hinge line, thereby immediately pocketing and cushioning an egg placed thereon.

2. A paperboard egg carton as set forth in claim 1, wherein the deeply downturned end cross-slit is substantially arcuate and extends sidewise approximately one-half the length of the cell, and the deeply upturned end cross-slit is substantially arcuate and extends sidewise approximately one-third the length of the cell.

3. A paperboard egg carton as set forth in claim 1, wherein each of said downturned and upturned cross-slits of said cathedral has at least one small, easily broken nick on each side of its junction with said longitudinal slit, said nicks normally holding the ends of said cathedral in place but being easily broken when an egg is placed in the cell.

4. In a paperboard egg carton having two parallel rows of egg receiving cells with each having a cathedral in the bottom of same, said carton having two opposed longitudinal side walls, a pair of bottom panel members with one connected to the lower edge of one of said side walls and the other connected to the lower edge of the other of said side walls, a one-piece central, longitudinal ridge member of inverted V-shape in transverse section, the second edge of each of said bottom members being connected to the adjacent bottom edge of said one-piece central longitudinal ridge member, a pair of upright tall transverse walls at opposite ends of said carton extending through the bottom thereof, intermediate upright transverse walls between said pair of tall transverse walls, and means joining the upper portion of all of said transverse walls to the upper portion of each of said side walls, the improvement comprising:

(a) said intermediate, upright, transverse walls being in pairs which are both shallow, and extend below the top of said longitudinal ridge member while terminating short of the bottom of said carton, said shallow transverse walls each having a continuous, relatively straight, unbroken lower edge, at least in the central portion of same, with a centrally located opening therethrough above said unbroken lower edge, (b) said longitudinal ridge member having hooks therein at the top thereof for engaging said openings in each of said shallow transverse walls, said ridge having openings below said hooks and notches in the top of said ridge at the free end of said hooks in position to receive and guide the bottom portion of each of said shallow transverse walls with said openings therein into engagement with said hooks, to hold said shallow transverse walls anchored in upright position substantially perpendicular to the bottom of said carton when the latter is in set-up form, (c) said openings below said hooks in said ridge being narrow at their lower portion substantially below the base of said hooks so as to contact the bottom portion of an engaged, shallow transverse wall below said opening therethrough in order to hold the bottom portion of said transverse wall in engagement with said hook substantially at the base of same, (d) hook means for holding said tall transverse walls crosswise of said longitudinal ridge member in upright set-up position substantially parallel to said hooked-down shallow transverse walls, which are between said tall transverse walls, (e) said carton bottom being cut so that said tall transverse walls of the set-up carton extend therethrough with at least a part of said cut bottom portion of said carton gripping said transverse walls and resisting removal therefrom, and (f) said cathedral being located in said ridge panel and bottom panel and substantially centered lengthwise of each of said cells but falling short of reaching both the top of said ridge panel and the bottom of said bottom panel while being over half way down the latter, said cathedral having a longitudinal slit from its top to its bottom and a cross-slit substantially symmetrical thereto and substantially at the junction of said ridge panel and bottom panel, the upper end of said longitudinal slit joining a deeply downturned end cross-slit extending sidewise in the range of approximately two-fifths to three-fifths the length of said cell while the lower end of said longitudinal slit joins a deeply upturned end cross-slit extending sidewise in the range of approximately one-fifth to one-half the length of said cell, said cross-slit at the junction of said ridge panel and bottom panel portions being of a length substantially intermediate of the sidewise extension length of said downturned and upturned cross-slits, with said downturned slit being larger in endwise dimension than said upturned slit and both said upturned and downturned slits being substantially symmetrical with the ends of said longitudinal slit.

5. A paperboard egg carton as set forth in claim 4, wherein said hooks for each of said shallow, transverse walls extend in opposite directions to each other.

6. A paperboard egg carton as set forth in claim 4, wherein said notches in the top of said longitudinal ridge member are of open construction forming an open throat connecting said notch to said opening under said hooks to facilitate passage of the bottom edge of said shallow transverse walls therethrough and under said hooks, and wherein the side of said notch opposite the point of said hook is of substantially straight continuous form terminating at the top of said narrow lower portion of said opening below the base of said hook.

7. In a paperboard egg carton having two parallel rows of egg receiving cells with each having a cathderal in the bottom of same, said carton having two opposed longitudinal side walls, a pair of bottom panel members with one connected to the lower edge of one of said side walls and the other connected to the lower edge of the other of said side walls, a one-piece central, longitudinal ridge member of inverted V-shape in transverse section, the second edge of each of said bottom members being connected to the adjacent bottom edge of said one-piece central, longitudinal ridge member, a pair of upright tall transverse walls at opposite ends of said carton extending through the bottom thereof, intermediate upright transverse walls between said pair of tall transverse walls, and means joining the upper portion of all of said transverse walls to the upper portion of each of said side walls, the improvement comprising:

(a) said intermediate, upright, transverse walls being in pairs which are both shallow and extend below the top of said longitudinal ridge member while terminating short of the bottom of said carton, said shallow transverse walls each having a continuous, relatively straight, unbroken lower edge, at least in the central portion of same, with a centrally located opening therethrough above said unbroken lower edge, (b) said longitudinal ridge member having hooks therein at the top thereof for engaging said openings in each of said shallow transverse walls, said ridge having openings below said hooks and notches in the top of said ridge at the free end of said hooks in position to receive and guide the bottom portion of each of said shallow transverse walls with said openings therein into engagement with said hooks, to hold said shallow transverse walls anchored in upright position substantially perpendicular to the bottom of said carton when the latter is in a set-up form, (c) hook means for holding said tall transverse walls crosswise of said longitudinal ridge member in upright set-up position substantially parallel to said hooked-down shallow transverse walls, which are between said tall transverse walls, (d) said carton bottom being cut so that said tall transverse walls of the set-up carton extend therethrough with at least a part of said cut bottom portion of said carton gripping said transverse walls and resisting removal therefrom, and (e) said cut in the carton bottom for said tall, transverse walls including an opening with one side adjacent and substantially parallel to the end of the carton, and a first slit which extends from the lower end of said opening and reaches almost to the bottom edge of said carton, said opening having a bottom slope terminating at the upper end of said first slit, a pair of short longitudinal slits extending toward said shallow partitions with one of said slits being at the end of said first slit, said second longitudinal slit being between the upper end of said opening and substantially the start of said slope toward said first slit.

8. A paperboard egg carton as set forth in claim 7, wherein the upper end of said opening for said tall transverse walls is substantially straight and longitudinal of the egg carton, said first slit which extends from the lower end of said opening being substantially a continuation of the side of said opening which is adjacent and substantially parallel to the end of the carton, and wherein said second longitudinal slit extends from said opening substantially at the start of said slope toward said first slit.

9. A cellular egg carton with an inverted V-shape center longitudinal ridge, said carton having both a pair of tall transverse end walls and a pair of shallow transverse walls between same, said shallow transverse walls each having an unbroken bottom edge portion and a substantially central inverted V-shape triangular opening therethrough above said unbroken bottom edge portion, said inverted V-shape ridge having hook means directly below each of said shallow transverse walls with a notch, the top of which slopes lengthwise of said carton in both directions, above said hook means and an opening below same with a passageway connecting said notch with said opening at the points of said hooks, said hook means for said pair of shallow transverse walls extending in a direction from each of said shallow walls toward the other, said opening below said hooks being shaped to receive the unbroken lower edge of said shallow transverse wall, which is adjacent thereto, and hold said shallow transverse wall substantially perpendicular to the bottom of said carton while anchoring same below said hooks and spaced away from said slits so as to firmly hold said shallow transverse wall upright while minimizing the chances of disengagement of said shallow transverse wall from said hooks on said ridge, and wherein said pair of tall transverse end walls and said ridge have and utilize the same type of interengaging means as said shallow transverse walls between them with the hooks of said ridge for engaging said tall transverse end walls extending in an inward direction toward each other lengthwise of said carton, and wherein at the junction of the bottom portion of said carton with the ridge portion thereof, at both sides of said ridge, there is provided directly under, and spaced from said interengaging means for said tall transverse end walls, an elongated opening with a slit extending from the lower end of each of said elongated openings, and in the same general direction, a major portion of the distance to the side walls of said carton, a V-slit in the bottom of said carton at the outer end of said slit extending from the lower end of said elongated opening, said latter slit extending into and terminating short of the bottom of the hollow side of said V-slit which has its point closely adjacent the junction of the carton bottom panel with the side wall panel connected thereto, said elongated openings and slits extending from same being adapted to have the lower ends of said tall transverse end walls extend a substantial distance therethrough with said V-slit aiding said extending slit to give downward when said lower ends of said tall transverse wall is forced therethrough, with said extending slits providing both side support for the bottom of said tall transverse end walls and gripping of the lower ends of same to resist withdrawal therefrom.

References Cited by the Examiner
UNITED STATES PATENTS

| | | | |
|---|---|---|---|
| 1,367,378 | 2/1921 | Gruenberg | 229—19 |
| 1,915,171 | 6/1933 | Troyk | 229—29 |
| 1,962,296 | 6/1934 | Burger | 229—29 |
| 2,755,984 | 7/1956 | Reifers | 229—28 |
| 2,873,059 | 2/1959 | Reifers | 229—28 |
| 2,995,289 | 8/1961 | Swanson | 229—28 |

FOREIGN PATENTS 9,728/32  10/1932  Australia.

FRANKLIN T. GARRETT, *Primary Examiner.*